United States Patent
Schleicher et al.

(10) Patent No.: US 8,750,408 B2
(45) Date of Patent: Jun. 10, 2014

(54) TRANSMISSION DEVICE FOR GENERATING AN ANALOG MODULATED PULSE TRAIN AND FOR TRANSMITTING THE SAME AND A RECEIVING DEVICE FOR RECEIVING A RESPECTIVE SIGNAL

(75) Inventors: Bernd Schleicher, Munich (DE); Hermann Schumacher, Blaustein (DE)

(73) Assignee: Universitat Ulm (DE)

( * ) Notice: Subject to any disclaimer, the term of this patent is extended or adjusted under 35 U.S.C. 154(b) by 411 days.

(21) Appl. No.: 13/122,832

(22) PCT Filed: Oct. 7, 2009

(86) PCT No.: PCT/EP2009/007200
§ 371 (c)(1),
(2), (4) Date: Sep. 28, 2011

(87) PCT Pub. No.: WO2010/040519
PCT Pub. Date: Apr. 15, 2010

(65) Prior Publication Data
US 2012/0045009 A1      Feb. 23, 2012

(30) Foreign Application Priority Data

Oct. 7, 2008   (EP) ..................................... 08017560

(51) Int. Cl.
*H04L 27/00*      (2006.01)
(52) U.S. Cl.
USPC ......................................................... 375/295
(58) Field of Classification Search
USPC ........................................ 375/295, 316, 324
See application file for complete search history.

(56) References Cited

U.S. PATENT DOCUMENTS

| | | | | |
|---|---|---|---|---|
| 5,208,835 | A | * | 5/1993 | Weeks et al. .................. 375/272 |
| 7,555,223 | B2 | * | 6/2009 | Kawanishi et al. ........... 398/185 |
| 7,675,455 | B2 | * | 3/2010 | Hatono ........................... 342/33 |

(Continued)

FOREIGN PATENT DOCUMENTS

| EP | 1489802 A2 | 12/2004 |
|---|---|---|
| EP | 1526693 A1 | 4/2005 |

(Continued)

OTHER PUBLICATIONS

"International Application No. PCT/EP2009/007200, International Search Report and Written Opinion mailed Jan. 21, 2010", 12 pgs.

(Continued)

*Primary Examiner* — Jaison Joseph
(74) *Attorney, Agent, or Firm* — Schwegman Lundberg & Woessner, P.A.

(57)   ABSTRACT

The present invention relates to a transmitting device for producing an analog-modulated pulse train and for emitting the same, comprising a pulse generator, with which a pulse train with an individual pulse form can be produced such that the pulse train falls in a predefined frequency band and/or into a predefined frequency mask, a modulation unit connected to the pulse generator and with which a pulse train can be analog-modulated by means of a predefined modulation scheme with respect to the amplitude thereof and/or the position of the individual pulses thereof, and an emitting unit, in particular an antenna, connected to the pulse generator and/or to the modulation unit and suitable for emitting in the predefined frequency band and/or in the frequency range of the predefined frequency mask, with which emitting unit the analog-modulated pulse train can be emitted, in particular beamed.

20 Claims, 11 Drawing Sheets

(56) References Cited

U.S. PATENT DOCUMENTS

| | | | |
|---|---|---|---|
| 2002/0097790 A1* | 7/2002 | Dress et al. | 375/219 |
| 2003/0156673 A1* | 8/2003 | Yanai | 375/371 |
| 2004/0153270 A1* | 8/2004 | Yamashita et al. | 702/81 |
| 2004/0174928 A1 | 9/2004 | Siwiak et al. | |
| 2005/0100076 A1 | 5/2005 | Gazdzinski et al. | |
| 2005/0175357 A1* | 8/2005 | Kawanishi et al. | 398/187 |
| 2005/0260952 A1* | 11/2005 | Santhoff et al. | 455/88 |
| 2006/0012511 A1* | 1/2006 | Dooi et al. | 342/70 |
| 2006/0078041 A1* | 4/2006 | Uchiyama et al. | 375/146 |
| 2007/0001811 A1* | 1/2007 | Kiyohara | 340/10.1 |
| 2007/0046526 A1* | 3/2007 | O'Hora et al. | 342/26 R |
| 2007/0139107 A1* | 6/2007 | Dittmer | 330/136 |
| 2008/0170642 A1* | 7/2008 | Seki et al. | 375/329 |
| 2010/0014874 A1* | 1/2010 | Kawanishi et al. | 398/187 |
| 2010/0135347 A1* | 6/2010 | Deladurantaye et al. | 372/30 |

FOREIGN PATENT DOCUMENTS

| | | |
|---|---|---|
| GB | 2431832 A | 5/2007 |
| WO | WO-2005/053168 A2 | 6/2005 |
| WO | WO-2005/067242 A1 | 7/2005 |
| WO | WO-2006/052462 A2 | 5/2006 |

OTHER PUBLICATIONS

Dederer, Jochen, et al., "A SiGe Impulse Generator for Single-Band Ultra-Wideband Applications", Semicond. Sci. Techno. 22 (2007) S200-S203, (2007), 200-203.

* cited by examiner

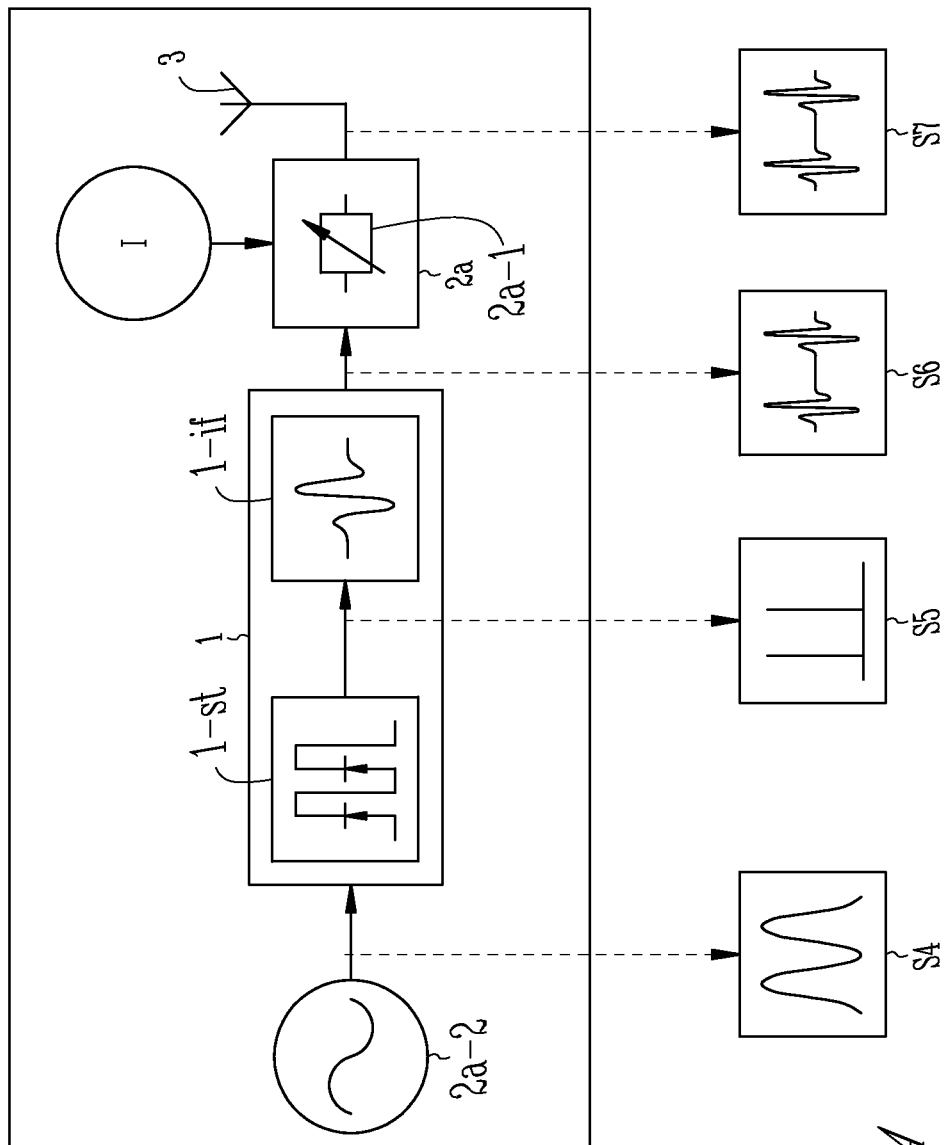

TRANSMISSION DEVICE FOR GENERATING AN ANALOG MODULATED PULSE TRAIN AND FOR TRANSMITTING THE SAME AND A RECEIVING DEVICE FOR RECEIVING A RESPECTIVE SIGNAL

PRIORITY CLAIM TO RELATED APPLICATIONS

This application is a national stage application under 35 U.S.C. §371 of PCT/EP2009/007200, filed Oct. 7, 2009, and published as WO 2010/040519 A1 on Apr. 15, 2010, which claims priority to European Application No. 08017560.7, filed Oct. 7, 2008, which applications and publication are incorporated herein by reference and made a part hereof in their entirety, and the benefit of priority of each of which is claimed herein.

BACKGROUND

The present invention relates to a transmitting device for producing an analogue modulated pulse train and for emitting the same and also to a receiving device for receiving an analogue modulated pulse train emitted by a transmitting device. The present invention relates furthermore to corresponding transmitting and receiving methods. The emitting or receiving can thereby be implemented via suitable antennae, however it is also conceivable to use the present invention within the scope of for example cable-based systems. The sphere of use of the present invention thereby relates in particular to the UWB band range (ultra-wide band) and thereby in particular to bands, as are defined in the decision of the EU commission of 21 Feb. 2007 (File no. K (2007) 522; 2007/131/EC) or in the Federal Communications Commission Report of 22 Apr. 2002 (FCC 02-48) by the Federal Communications Commission, Washington D.C. 20554.

The digital modulation of ultra-wide band pulses (hereinafter also UWB pulses) is already known from prior art (see e.g. Faranak Nekoogar "Ultra-Wideband Communications: Fundamentals and Applications" Prentice Hall, 2005). Furthermore, known amplitude modulation—(hereinafter: AM) and/or frequency modulation—(hereinafter: FM) types of transmission or digital types of transmission use other frequency bands. For example base band pulses are thus modulated by digital types of modulation of individual pulses (On-Off Keying, discrete pulse amplitude modulation, discrete pulse position modulation, . . . ).

BRIEF SUMMARY

It is disadvantageous with the previously known methods in particular that they are not suitable for simple conversion of existing short-range transmission systems to the UWB range, in particular to the above-mentioned UWB bands.

It is therefore the object of the present invention to make available a transmitting device and a receiving device, with which signal transmissions can be produced in a simple, reliable and interference-immune manner in the UWB range. Furthermore, the object is to make available a corresponding transmitting device and receiving device, with which existing short-range transmission systems can be used in the UWB range. Finally, it is furthermore the object of the present invention also to make available corresponding transmitting and/or receiving methods.

The above-mentioned object is achieved by a transmitting device according to claim 1, by a receiving device according to claim 7, by a transmitting and receiving device according to claim 11 and also by a transmitting method and/or receiving method according to claim 12. Advantageous embodiments can thereby be deduced respectively from the dependent claims.

The present invention is now firstly described in general. Various examples of transmitting devices according to the invention or of receiving devices according to the invention are placed alongside this general description. The transmitting and/or receiving devices produced within the scope of the subsequently described examples need not however be produced, within the scope of the present invention, in the illustrated example configurations, instead they can be produced or used within the scope of the present invention or of the patent claims also with other combinations of features.

The core of the present invention is the analogue modulation of the envelope curve and/or the analogue modulation of the position of a pulse train on the transmitter side and a corresponding demodulation on the receiver side. By implementation of this basic idea, existing short-range transmission systems, which use for example FM as type of modulation, can be adapted very easily to the new user spectrum or to the UWB band width. The present invention hence enables, by means of continuous, analogue modulation of the envelope curve and/or by analogue modulation of the position of a base band pulse train, radio or even cable transmission of analogue or digital signals which can take place in particular in newly-licensed, still hardly used UWB frequency bands.

The analogue signal to be transmitted can be present for example as an amplitude-modulated (AM) or frequency-modulated (FM) signal, a digital data signal to be transmitted can be present for example as phase shift keying (PSK) or quadrature-amplitude-modulated (QAM) signal.

According to the invention, a pulse train, which is produced as described subsequently in more detail, is modulated with this signal. In the case of a pulse with no direct component, the transmission can then be effected via conventional antennae which allow broadband transmission, as are known to the person skilled in the art. The transmission can thereby, as described above, use in particular newly-licensed frequency bands for UWB pulses.

For demodulation on the receiver side, pulses with no direct component are firstly converted, according to the invention, into pulses with a direct component (by means of a suitable non-linear operation, for example rectifying or squaring).

By suitable filtering, in particular by band pass filtering, the first or one of the higher spectral lines of frequency lines is selected. Each of these spectral lines comprises the chosen type of modulation. Subsequently, a demodulation can be effected with current methods (e.g. AM-, FM-, PSK- or QAM demodulation).

The present invention can thus be described for example, in header form, by amplitude-modulated pulse UWB, analogue pulse amplitude modulation, frequency-modulated pulse UWB, analogue pulse position modulation, PSK-UWB, QAM-UWB etc.

By means of the present invention, in particular existing short-range transmission systems which use e.g. FM as type of modulation, can be adapted very easily to the new user spectrum of the UWB band. The transmission can take place therefore in the newly-licensed, still hardly used UWB frequency band. The transmitting and/or receiving devices according to the invention are robust relative to sources of radio noise which are located in the band. The transmitting and/or receiving method is multiuser-capable by choosing another transmitting carrier frequency at the input of the pulse generator and corresponding adaptation to the frequencies in the receiver. In particular, within the scope of the present invention, simple transmitting and/or receiving systems are possible. In one simple example, the signal of a frequency-modulated walkie-talkie, e.g. in the VHF range, can be modulated firstly onto a UWB pulse train. The UWB signal can then be transmitted per UWB radio transmission between two locations. In the receiver, the FM signal can be recovered and reproduced via a similar FM walkie-talkie.

Transmitting devices and/or receiving devices according to the present invention can be used in particular in the field of transmission of audio signals. The signals to be transmitted (hereinafter also termed information signals) can however also concern quite generally communications signals, digital signals, control- and/or regulation signals or even voice signals etc. which are to be transmitted between individual device units.

BRIEF DESCRIPTION OF THE DRAWINGS

The present invention is now described subsequently with reference to several embodiments.

There are thereby shown:

FIGS. 2a to 2d an AM-based transmitting device according to the present invention (FIG. 2a), a non-modulated carrier-free base band pulse train in the time range (FIG. 2b) and also in the frequency range (FIG. 2c) and an analogue pulse amplitude modulation or a pulse train analogue-modulated with an analogue modulation scheme with respect to the amplitude of its individual pulses (FIG. 2d).

DETAILED DESCRIPTION

Figure 1A:
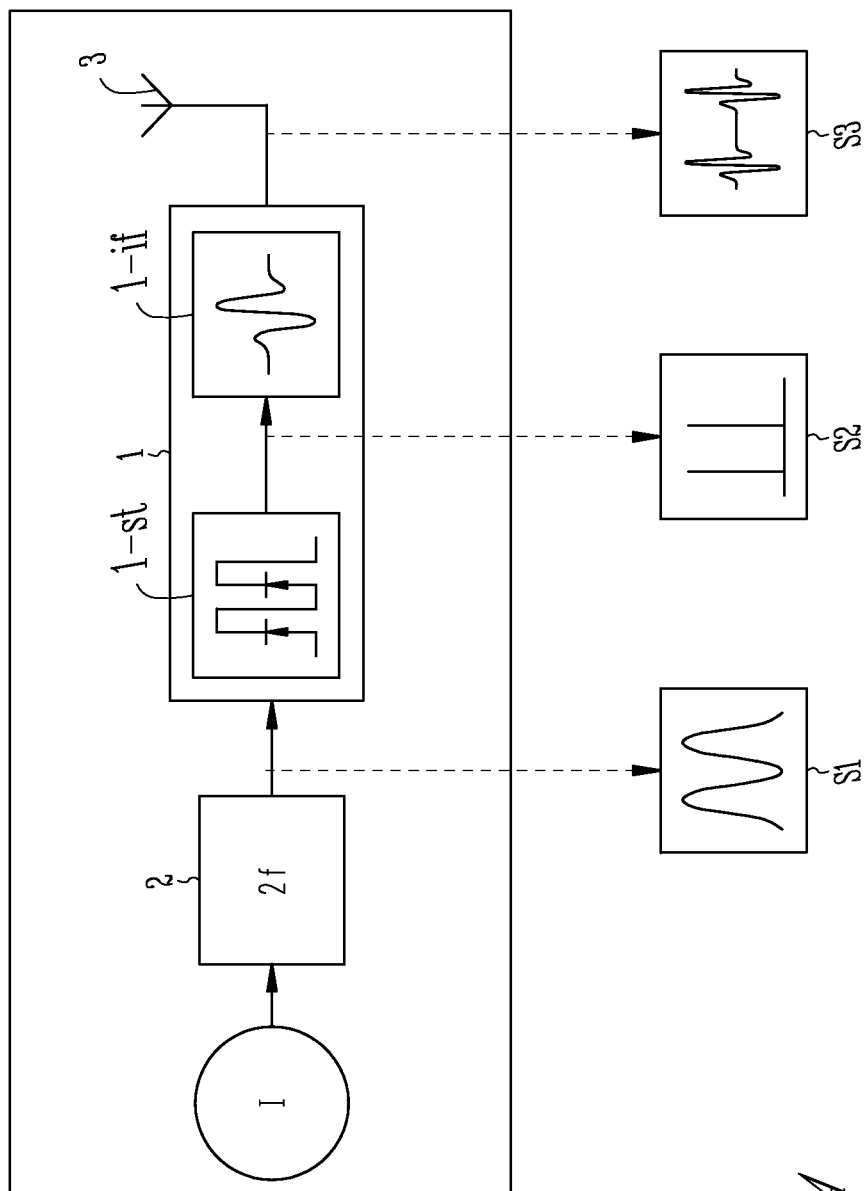
FIGS. 1a and 1b an FM-based transmitting device according to the invention and also an example of an analogue pulse position modulation or frequency modulation of pulses.

FIG. 1a shows a first transmitting device according to the invention for producing an analogue modulated pulse train and for emitting the same. The transmitting device comprises a pulse generator 1, with which a pulse train with an individual pulse form which falls within the frequency range into a predefined UWB frequency mask is produced. Of concern thereby can be for example the above-described UWB frequency masks prescribed by the EU Commission or by the FCC. There is connected to the pulse generator 1, a modulation unit 2, with which a pulse train to be produced by the pulse generator 1 can be analogue-modulated by means of an FM modulation scheme with respect to the position of the individual pulses thereof. For this purpose, the pulse generator 1 is connected, on the signal input side, to a frequency-modulating unit 2f (which here forms the modulation unit 2). The frequency-modulating unit 2f is configured here as an analogue frequency modulator, with which an information signal I supplied thereto (for example a voice signal or similar to be transmitted) can be modulated and can be supplied as frequency-modulated carrier signal to the pulse generator as input signal (frequency-modulated, sinusoidal input signal S1 of the pulse generator 1).

With the pulse generator 1 there is now generated from the input signal S1, a pulse train which is frequency-modulated corresponding to the frequency modulation of the input signal and which falls in the frequency range into the predefined frequency mask. For this purpose, the pulse generator 1 has a threshold value trigger unit 1-st, with which a periodic, frequency-modulated train of pulse peaks (signal S2) is produced from the supplied, frequency-modulated periodic (sinusoidal) input signal. In the present case, this trigger unit 1-st is formed on the basis of a limiting amplifier and a capacitative differentiator (basic construction known to the person skilled in the art).

The frequency-modulated pulse peak signal S2 is then formed further in the pulse generator 1 by the pulse forming unit 1-if subsequent to the trigger unit 1-st such that a pulse train falling into the mentioned frequency mask is produced. This takes place here on the basis of an RLC oscillating circuit which is included by the pulse forming unit 1-if (not shown; the precise construction of such a pulse forming unit is known to the person skilled in the art) and configured to join two pulse forms.

On the signal output side, a frequency-modulated pulse train S3 is hence present on the pulse generator 1. This frequency-modulated pulse train can then be beamed out by the antenna 3 which is disposed on the signal output side of the pulse generator 1 and connected to the pulse generator 1. The antenna 3 is thereby configured as a broadband antenna such that it can beam over the entire frequency range of the frequency mask.

Figure 1B:
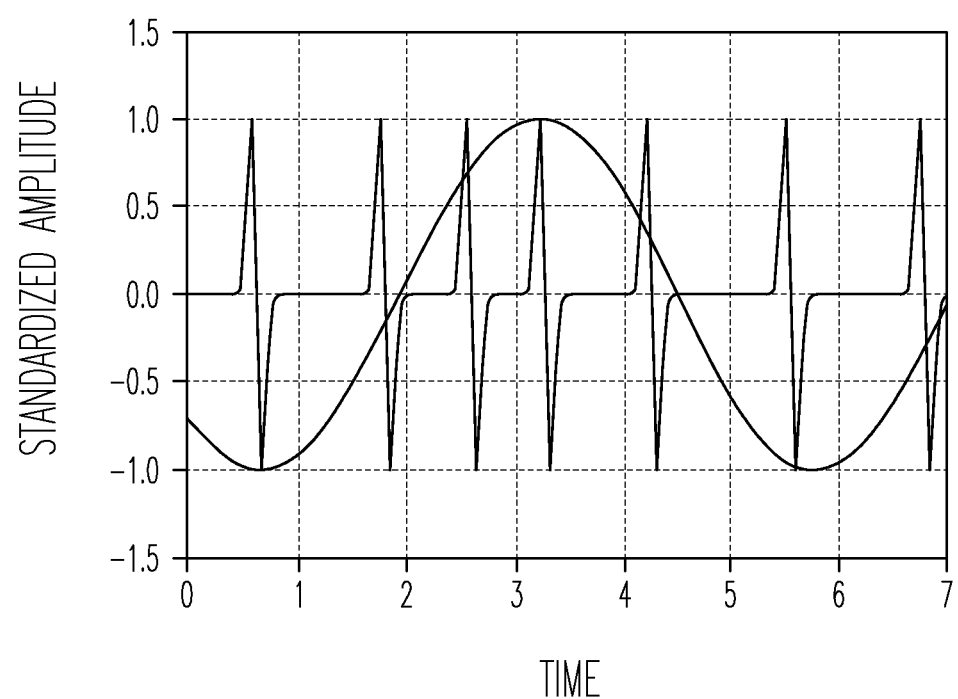

FIG. 1b sketches the signal S3, i.e. the pulse train which is present at the output of the pulse generator 1 and subjected to an analogue pulse position modulation or an analogue FM modulation.

FIG. 1 hence shows the implementation of the idea according to the invention on the transmitter side in such a manner that carrier-free base band pulses (pulse train) were adapted to an existing, frequency-modulating FM modulation scheme (as described subsequently in more detail, an adaptation can likewise be effected according to the invention to another modulation scheme, such as for example an amplitude modulation scheme or a quadrature amplitude modulation scheme). In this way, already existing modulation technologies (and also demodulation technologies, see subsequent description of the receiver side) can be used in order to enable for example beaming in the UWB range. Transmission can be effected likewise also on cable-based systems. There can be used as information signals, any signals containing analogue or digital information. For example, of concern hereby can be voice signals, music signals or measuring data signals. These signals can then be used according to the invention (on the basis of the low permitted spectral power density of the above-described UWB frequency masks) first and foremost in the field of communication with a short range. The above-described transmitting device (this applies likewise to the also following transmitting or receiving devices) can be produced in a simple manner and at low cost.

As described above, the pulse generator 1, in the present case, has two main blocks: the threshold value trigger unit 1-st and the pulse forming unit 1-if disposed on the signal output side of this unit. The threshold value trigger unit 1-st comprises a threshold value detector, by means of which a pulse peak is produced in the case of each threshold value occurrence (a specific signal threshold being exceeded). Thus, the incoming periodic signal (for example: sinusoidal or rectangular signal) is converted into a periodic train of pulse peaks with a repetition rate according to the supplied frequency (frequency of the signal S1). The pulse peak train with this repetition rate is then supplied to the pulse forming unit 1-*if* which is configured such that it issues a base band pulse for each pulse peak. With the pulse forming unit, a pulse train is then produced from the periodic train of pulse peaks, which pulse train falls in the frequency range into the predefined frequency mask (or into a predefined frequency band): the form of the base band pulse is then (viewed with respect to the average frequency, the pulse duration, the precise pulse form etc.) such that the produced base band pulse, viewed with respect to its frequency spectrum or in the frequency range, fits into the above-described frequency mask. The threshold value trigger unit 1-*st* can be produced on the basis of a limiting amplifier and a differentiator. The pulse forming unit 1-*if* is produced here on the basis of an RLC oscillating circuit and adapted such that its output signal produces a short high-frequency pulse by means of a highly-attenuated resonance.

The basic construction of these embodiments is thereby known to the person skilled in the art (see e.g. J. Dederer at al.: "a SiGe impulse generator for single-band ultra-wideband applications", Semiconductor Science and Technology, vol. 22, pp. 200-203, December 2006); however also other embodiments are possible: thus for example the pulse peaks in the pulse generator 1 can be produced by small time differences in digital components and the pulse formation can be implemented on the basis of using oscillators with LC oscillating circuits. Also finally a principle can be used in the case of which a pulse is used to mask sections of a sinusoidal signal of a free-running oscillator.

The transmitter variant of the present invention, shown in FIG. 1*a*, has the advantage in particular that simple, economical and readily obtainable components can be used for the modulation (this applies likewise to the subsequently also described demodulation or the receiving side). Hence, it is possible with minimum expenditure on additional components to use the UWB frequency band. In particular, the information signal I can hence be converted easily to the UWB frequency band, a conventional FM modulator (or a conventional frequency shift keying modulator or FSK modulator) 2*f* being used in order to supply the correspondingly modulated information signal I as input signal S1 to the threshold value trigger unit 1-*st* of the pulse generator 1. The output signal S1 of the frequency-modulating or frequency shift keying unit 2*f* is hence a frequency-modulated carrier signal S1, for example a radio frequency signal with a carrier frequency of 90 MHz and an applied FM modulation, as is used for example in conventional UKW radios. As this signal is then provided to the input of the pulse generator 1 or the threshold value trigger unit 1-*st*, frequency-modulated pulse peaks with an average repetition rate of 90 MHz which are then modulated according to the frequency-modulated input signal S1 are produced. The subsequent pulse forming unit 1-*if* produces frequency-modulated UWB pulses therefrom. Accordingly, no signal is therefore beamed in the UKW range, but instead the signal is converted to the UWB frequency range and then beamed. By suitable pulse formation by means of the pulse forming unit 1-*if*, the beamed signal then occupies the entire permissible band width (with the correspondingly permissible spectral intensities) of the UWB band or of the corresponding UWB frequency mask. The basic idea of the present invention can hence be regarded also as conversion of the signal of conventional FM transmitters (or, see subsequently, of AM- or QAM transmitters) into the UWB frequency spectrum and vice versa.

FIGS. 2*a* to 2*d* show a transmitting device according to the invention which operates on the basis of an amplitude modulation. The construction of this transmitting device is thereby basically similar to the construction of the transmitting device shown in FIG. 1*a* so that corresponding elements are provided with corresponding reference numbers and are described no longer in detail (the same applies also to the subsequent further embodiments on the transmitter- and/or receiver side).

In the case of AM modulation, the modulation unit 2 has an amplitude-modulating unit 2*a* which is connected, on the signal input side, to the signal output side of the pulse generator 1. This is configured here as an analogue amplitude modulator. Instead of the amplitude-modulating unit, also an amplitude shift keying unit 2*a* can however be provided, which unit has for example an ASK modulator.

The corresponding information signal I is then supplied to this unit which is disposed on the signal output side of the pulse generator 1. The amplitude-modulating unit 2*a* then modulates, with the supplied information signal, the pulse train which is tapped at the output of the pulse generator, is non-modulated and falls in the frequency range into the predefined frequency mask (which pulse train is then beamed via the antenna 3 in this form which is amplitude-modulated by the amplitude-modulating unit 2*a*).

Figure 2B:
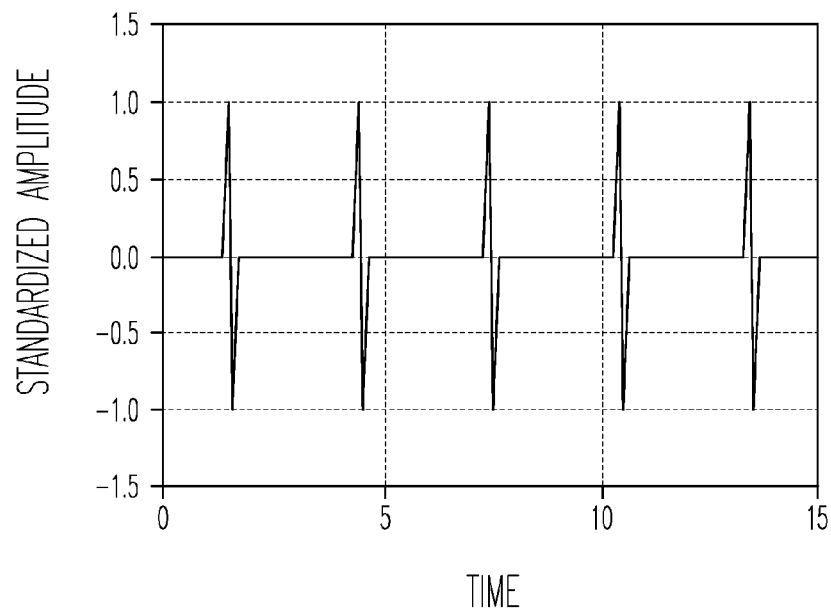
Figure 2C:
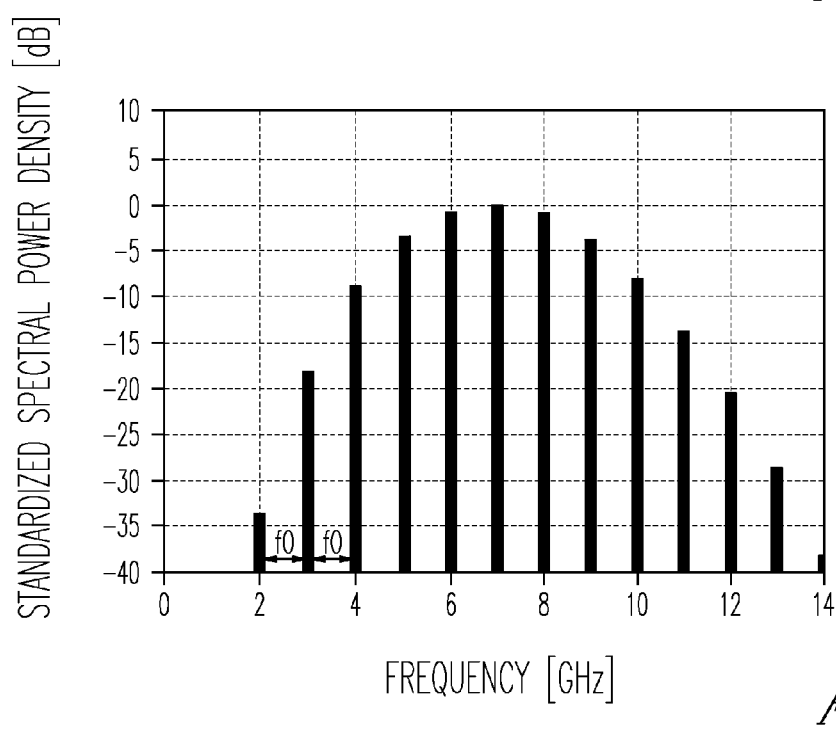

The pulse train which is tappable at the signal output of the pulse generator 1, is non-modulated and falls into the UWB frequency mask is produced here as follows: on the signal input side of the pulse generator 1, a unit 2*a*-2 which produces a periodic, here sinusoidal, non-modulated carrier signal is disposed. The periodic, non-modulated sinusoidal signal S4 thereof is supplied to the threshold value trigger unit 1-*st* of the pulse generator 1. The trigger unit 1-*st* produces a periodic pulse peak sequence S5 from this signal, from which sequence, by means of the pulse forming unit 1-*if*, the regular, non-modulated pulse train S6 which falls in the frequency range into the predefined UWB frequency mask is generated. The pulse train S6 is shown in detail in FIGS. 2*b* (in the time range) and 2*c* (in the frequency range). As in particular FIG. 2*c* shows, the pulse forming unit 1-*if* of the pulse generator is configured such that the spectrum of the continuous pulse train, with respect to the position of the individual frequencies and with respect to the spectral intensity of the individual frequencies, fits into the predefined UWB frequency mask. The individual discrete lines in the frequency range originate from the constant repetition rate of the pulses. These lines are weighted with the spectral envelope curve of the individual base band pulses. The repetition rate of the individual pulses thereby fixes the spectral spacing of the individual lines in the frequency range (spacing between two adjacent lines in FIG. 2*c*). As FIG. 2*c* shows, the pulse spectrum has in particular no direct component (this would not be transmittable by the antenna 3).

Figure 2D:
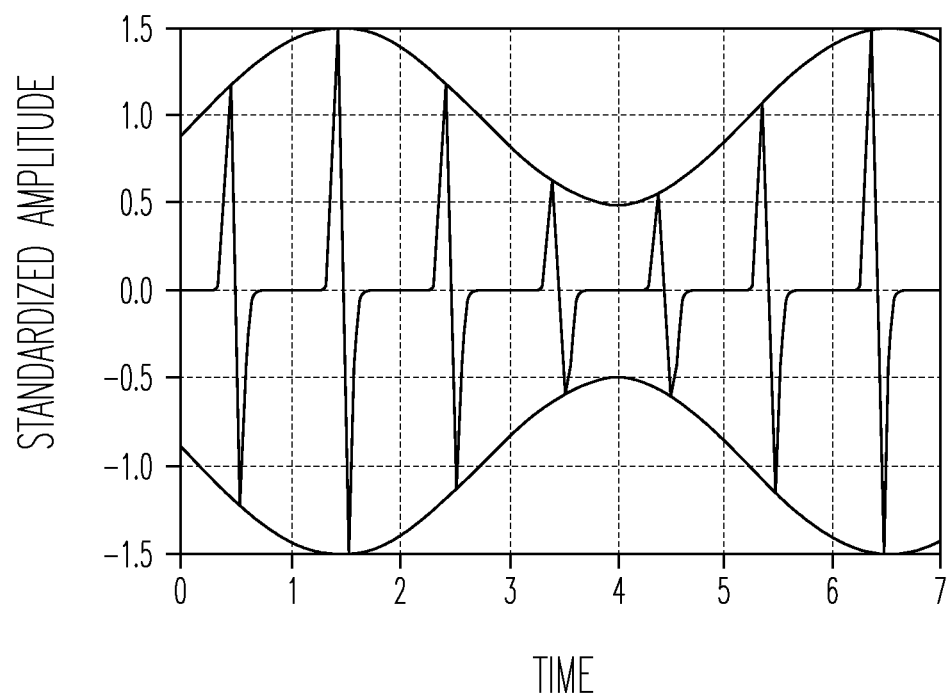

The amplitude-modulating unit 2*a* which is disposed on the signal output side of the pulse generator 1 now has a controllable amplitude regulator 2*a*-1, with which the amplitude of the individual pulses of the output signal S6 of the pulse generator 1 is adjustable corresponding to the momentary amplitude of the information signal I supplied to the amplitude-modulating unit 2*a* (amplitude-modulated pulse train as analogue pulse amplitude modulation of the amplitudes of the individual pulses of the pulse train S6, see FIG. 2*d*).

In this way, the pulse train S7, as amplitude-modulated pulse train corresponding to the fixed UWB frequency mask, is beamed via the antenna 3.

In the case of AM modulation (or amplitude shift keying modulation or the ASK scheme for digital signals), the signal supplied to the pulse generator is hence a non-modulated, continuous, periodic (e.g. sinusoidal or rectangular) signal which fixes the carrier frequency of the transmission. This signal is then converted in the pulse generator into the continuous, not yet amplitude-modulated pulse train. For the subsequent amplitude modulation, it is then necessary to dispose an additional component in the form of the electronically controllable amplitude regulator 2a-1 at the signal output of the pulse generator.

The information signal I then determines, during the amplitude modulation, the change in amplitude of the individual pulses, hence amplitude-modulated pulses are produced in the pulse train.

It is already evident from the presented two examples how, according to the invention, the amplitude and/or the position of the individual pulses of the pulse train can be varied for a pulse train based on a conventional modulation scheme, such as for example an AM-, an FM-, a PSK- or a QAM modulation scheme (see also the subsequent example for the latter). FIG. 1b hereby shows a purely frequency-modulated pulse train, FIG. 2d a purely amplitude-modulated pulse train. The spectral form of the signal thereby changes in such a manner that all spectral lines are widened by the modulation, whereas the envelope curve remains unchanged (see FIG. 2c). The transmitting device according to the invention thus influences for example the amplitude of the pulses in the case of AM modulation, the position of the pulses in the example of FM modulation or both at the same time in the case of QAM modulation also presented subsequently.

Figure 3:
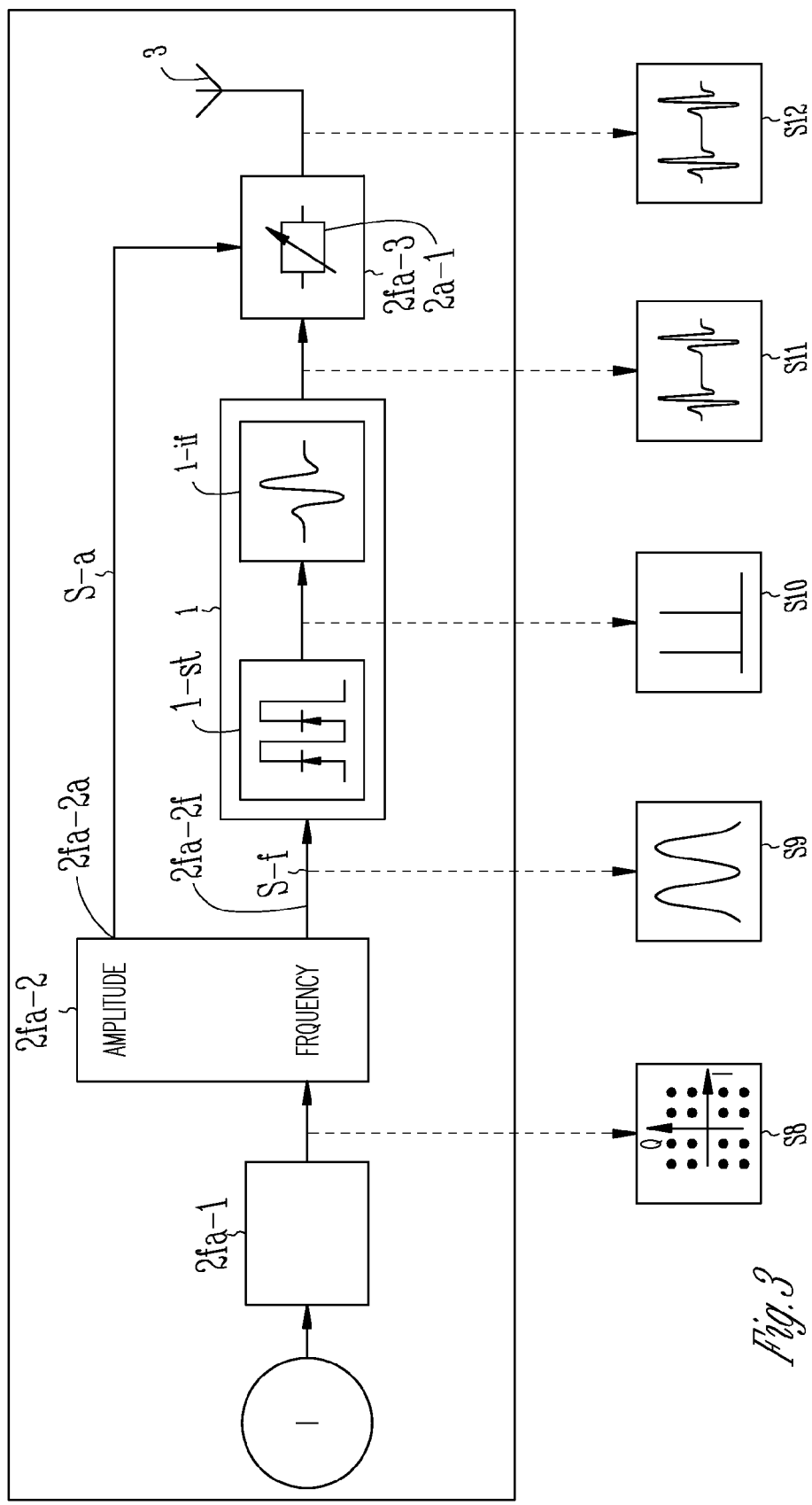
FIG. 3 a quadrature amplitude modulation-based transmitting device according to the invention.

FIG. 3 shows a further example of a transmitting device according to the invention, in the case of which, in contrast to the two above-described transmitting devices, the modulation unit 2 is configured as follows: the information signal I is supplied to a frequency-modulating and amplitude-modulating FM/AM unit 2fa-1 and converted, in the latter, into a frequency- and, synchronously thereto, amplitude-modulated quadrature amplitude modulation signal (hereinafter also: QAM signal) S8. Instead of a quadrature amplitude modulation, the unit 2fa-1 can however also be configured as a frequency shift keying and, synchronously thereto, amplitude shift keying unit implementing for example a BPSK scheme or a four-phase modulation scheme (QPSK scheme).

The frequency- and amplitude-modulated signal S8 is then supplied to an amplitude-frequency separator 2fa-2 of the modulation unit 2. This amplitude-frequency separator 2fa-2 splits the frequency- and, synchronously thereto, amplitude-modulated signal S8 into a frequency-modulated component S-f and an amplitude-modulated component S-a. The frequency-modulated component S-f is then supplied via the frequency output 2fa-2f of the separator 2fa-2 to the threshold value trigger unit 1-st of a pulse generator 1 (which is constructed as described above). The frequency-modulated component S-f is sketched in FIG. 3 also as signal S9.

The frequency-modulated signal (e.g. a frequency-modulated sinusoidal signal) S9 is converted by the threshold value trigger unit 1-st of the pulse generator 1 into a periodic series of frequency-modulated pulse peaks S10 which are then in turn converted by the pulse forming unit 1-if into a frequency-modulated pulse train (which is fitted, as described above, into the UWB frequency mask) S11.

An amplitude-modulating unit 2fa-3 of the modulation unit 2 in the form of an analogue amplitude modulator is connected to the signal output of the pulse generator 1. In the case of a digital signal, instead of the amplitude-modulating unit 2fa-3, also an amplitude shift keying unit, for example in the form of an ASK modulator, can however be provided.

This analogue amplitude modulator 2fa-3 now has a second signal input which is connected to the amplitude output 2fa-2a of the amplitude-frequency separator 2fa-2. Via this input, the amplitude-modulated component S-a is hence supplied to the amplitude modulator 2fa-3. With this component S-a, the amplitude modulator 2fa-3 modulates the pulse train S11 which is frequency-modulated corresponding to the frequency-modulated component S-f, in addition with respect to the amplitude thereof (i.e. the amplitude of the individual pulses of the already frequency-modulated pulse train) so that, at the signal output of the amplitude modulator 2fa-3, a frequency- and, synchronously thereto, amplitude-modulated pulse train S12 is applied, which can be beamed via the antenna 3.

The amplitude-modulating unit 2fa-3 hereby has again a controllable amplitude regulator 2a-1, with which the amplitude of the individual pulses of the frequency-modulated pulse train S11 can be adjusted corresponding to the momentary amplitude of the amplitude-modulated component S-a and hence the signal S12 can be generated.

FIG. 3 hence shows a transmitting device according to the invention which can be used for a modulation scheme in the form of a quadrature amplitude modulation scheme (QAM scheme) or also for a binary phase modulation scheme (BPSK scheme) or a four-phase modulation scheme (QPSK scheme). Viewed in the time range, it is common to the signals of all these schemes that they provide both a frequency modulation and, synchronously thereto, an amplitude modulation. For conversion for example of a conventional QAM transmitter signal to a UWB pulse band signal, the additional component of the amplitude-frequency separator 2fa-2 which separates the frequency-modulated components (S-f) and the amplitude-modulated components (S-a, i.e. the envelope curve) is inter alia necessary here. The separated frequency signal S-f is then used in order to provide the pulse train with a frequency modulation, whereas the separated amplitude component S-a is used, for example with the help of an electronic amplitude regulator, for example in the form of an electronically controllable attenuator, an amplifier with controllable amplification, a multiplier or similar 2fa-3, to provide the pulse train in addition with an amplitude modulation.

The illustrated transmitting device hence combines basically the use of the schemes described in the two first embodiments (FM modulation scheme and AM modulation scheme) since not only can a QAM source 2fa-1, as shown in FIG. 3, be connected to the input connection of the amplitude-frequency separator 2fa-2: likewise, a purely FM source or a purely AM source can be connected thereto. With these sources, the respectively other components at the output of the separator is then constant (i.e. the amplitude is constant for an FM source and the frequency is constant for an AM source). The transmitting devices shown in FIGS. 1a and 2a can hence be regarded as simplifications of the transmitting device shown in FIG. 3.

In the case of the transmitting device according to the invention, the following restriction must generally be taken into account if AM sources or QAM sources are used in the modulation unit 2: in the amplitude-modulating unit 2a or 2fa-3, no negative amplitude, in the form of an electronically controllable attenuator, can be operated as the control input of the attenuator. A negative amplitude would in fact result in the transmission of an inverted pulse, which is basically not possible with an attenuator. Basically, this problem could be circumvented as a result of using a multiplier as amplitude regulator, however separation of negative and positive pulses is not possible in the receiver due to the rectifier unit. This restricts the AM scheme of modulation generally to an amplitude modulation without carrier suppression.

In the case of the QAM scheme, the input signals are in this case restricted to a modulation form in which they do not extend into the negative Q value range of the IQ plot (the IQ plot is a form of a Lissajous plot in which the QAM signals are normally represented; see also the sketch in the case of the signal S8, designated in FIG. 3 with 16 code points, normally as 16 QAM).

Figure 4A:
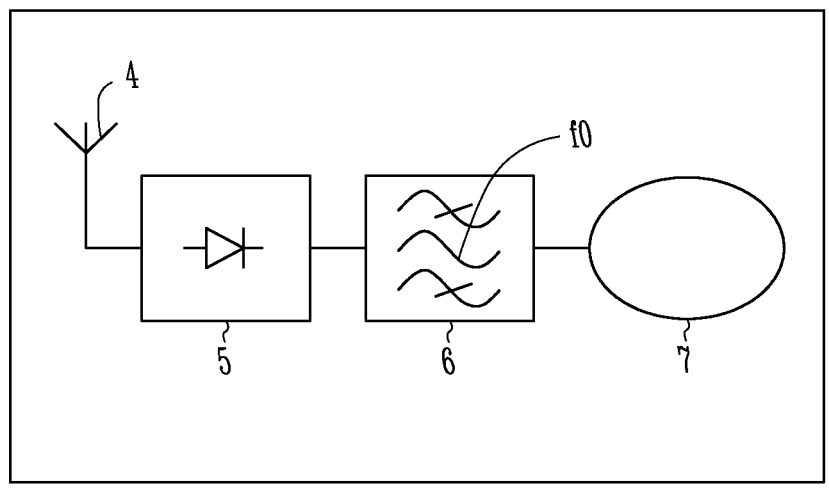
FIGS. 4a to 4d a simple receiver concept within the scope of the present invention (FIG. 4a), a rectified pulse train in the case of amplitude modulation (FIG. 4b), a rectified pulse train in the case of a frequency modulation (FIG. 4c) and also a spectrum of the rectified pulse train in the frequency range (FIG. 4d).

On the receiving side, the high-frequency spectrum must be rectified according to the invention in order to demodulate the information on the pulses of the pulse train in order to convert the pulse energy from the UWB frequency band to lower frequencies. FIG. 4a shows the simplest embodiment of a receiving device according to the invention for receiving the analogue modulated pulse train emitted by a transmitting device according to the invention. This receiving device comprises a receiving unit in the form of an antenna 4 which is suitable for receiving the pulse train, a rectifying unit 5 connected downstream of the receiving unit for rectifying the pulse train after receipt thereof, a frequency filter 6 connected downstream of the rectifying unit, which lets only defined frequency lines through and a demodulation unit 7 connected downstream of the frequency filter, with which the pulse train, after filtering thereof in the frequency filter, is demodulated with a demodulation scheme according to the modulation scheme used for modulation thereof.

The rectifying unit can comprise for example a diode, however can also be configured by means of a connected full-wave rectifier or squarer. The frequency filter 6 is advantageously configured as a band pass filter which lets through precisely one frequency line from the frequency spectrum of the rectified pulse train and in fact preferably the basic frequency or the frequency line which corresponds to the frequency of the repetition rate of the individual pulses of the pulse train (the frequency of which is subsequently also designated with f0).

Figure 4B:
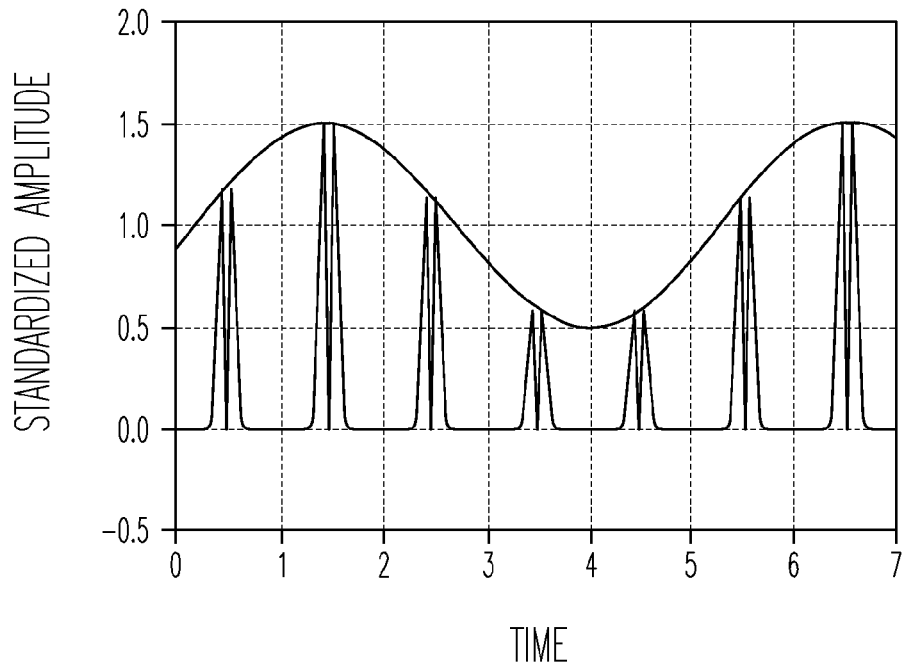
Figure 4C:
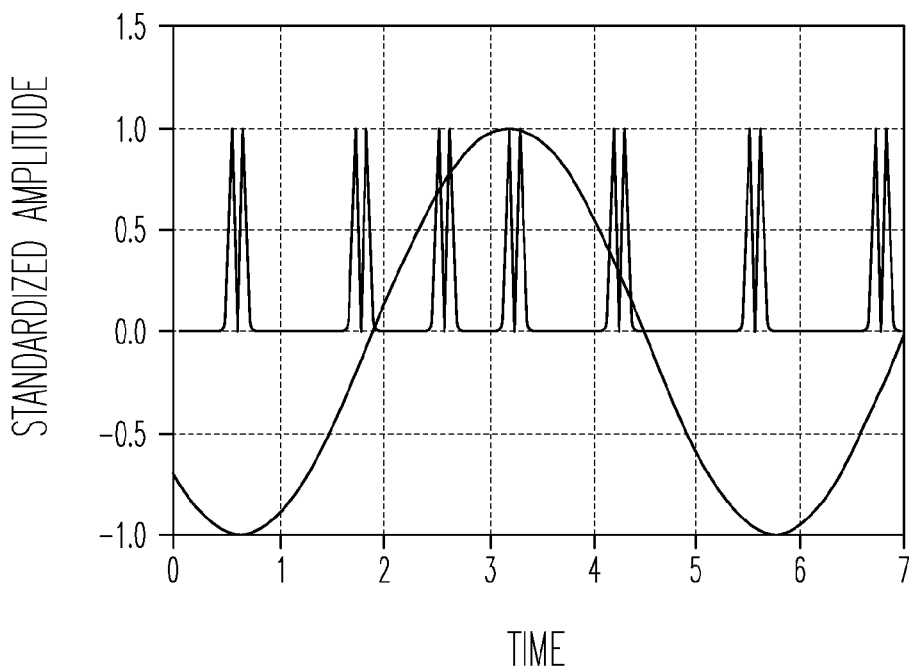
Figure 4D:
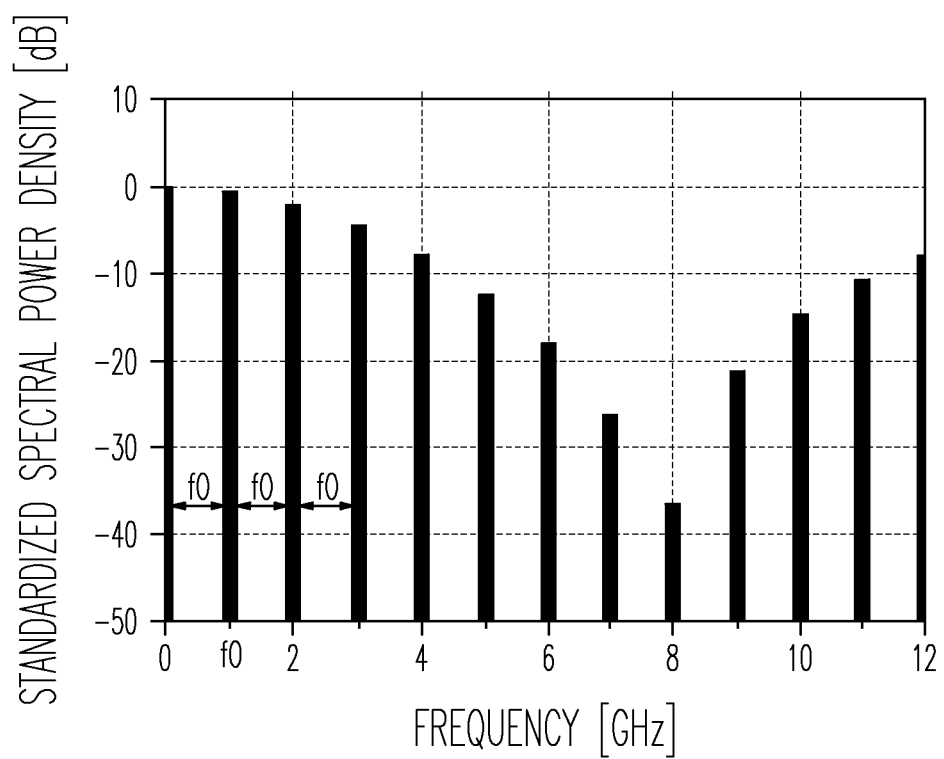

FIG. 4b shows an example of the rectified pulses in the pulse train in the case of amplitude modulation. FIG. 4c shows correspondingly an example of the rectification of the pulses of the pulse train by the rectifying unit 5 in the case of frequency modulation. If the pulse train on the transmitting side was modulated with an AM modulation scheme, an FM modulation scheme, a PSK modulation scheme or a QAM modulation scheme, the amplitude and/or the position of the individual pulses of the pulse train varies according to the modulation scheme which is used (FIGS. 4b and 4c show an amplitude- or frequency modulation of a base band pulse train). In the case of modulation, the form changes in the frequency range such that all the spectral lines or frequency lines are widened by the modulation but the envelope remains unchanged. The rectified individual pulses of the pulse train still carry the modulation information (see their form in the time range in FIGS. 4b and 4c), their spectrum in the frequency range (see FIG. 4d) now has however also a direct component at the frequency 0. The (apart from the direct component) first frequency line in the spectrum is then at the frequency f0, i.e. at the basic frequency or the repetition rate of the individual pulses. The further frequency lines are then respectively at a spacing of f0 (spacing of two adjacent frequency lines, see FIG. 4d), the modulated-up content being present on each of these (harmonic) frequencies.

With the frequency filter 6, which is configured here as band pass filter, precisely one frequency line is then selected advantageously, preferably of concern hereby is the frequency line at the basic frequency f0 (however the frequency line at the frequency 2f0, 3f0, . . . can also be selected). In the receiving device, either a fixed band pass filter with a sensibly fixed band width is used for this purpose (i.e. transmitting device and receiving device have been coordinated to each other in advance such that the receiving device recognises the band width range about the frequency f0) or a tuneable band pass filter is used in order to be able to change the transmitting and receiving range.

After a frequency line has been selected with the band pass filter or frequency filter 6, said frequency line is used by the demodulation unit, connected downstream of the frequency filter corresponding to a demodulation of the modulation scheme used for modulation of the emitted pulse train. According to the modulation scheme (e.g. AM, FM, . . . ), conventional demodulation units 7 known from prior art can hence be used in the receiver in order to demodulate the information. The simplest receiver concept of the present invention, shown in FIG. 4a, has a restriction insofar as all information which results in inversion or phase reversal of the pulse form cannot be demodulated (compare the description of the restriction in the amplitude modulation/QAM). A demodulation of inverted pulses is not possible with a correlation receiver which is described subsequently.

The receiving concept of the present invention, presented in FIG. 4a, has also the disadvantage in particular that (by cutting out an individual frequency line) the information is in fact fully available, however the cutting out is accompanied by a corresponding energy loss. Subsequently, an alternative, further improved receiving concept according to the present invention for improving the spectral efficiency is therefore described. The basic receiving concept of the extended receiver, shown in FIG. 5, is the same as that of the receiver shown in FIG. 4a so that only the differences or the additional components are subsequently described.

Figure 5:
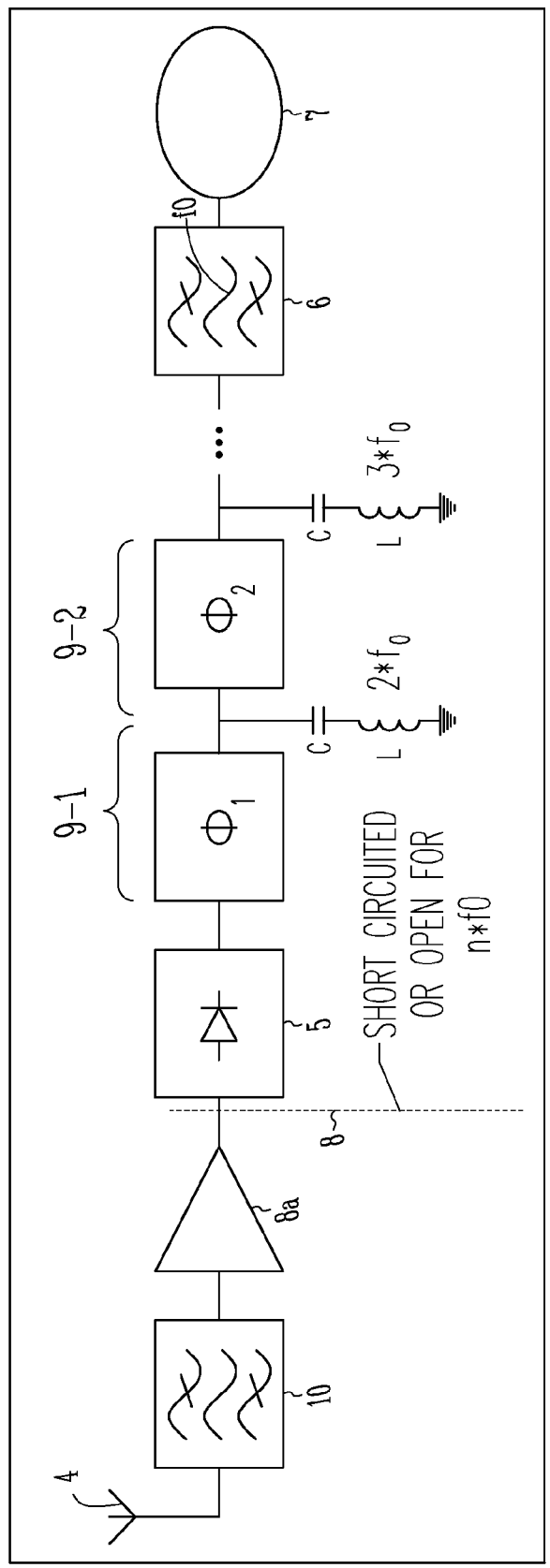
FIG. 5 an alternative receiver concept within the scope of the present invention with which the spectral efficiency of the receiving side can be improved.

The basic idea of the receiver, shown in FIG. 5, for improving the spectral efficiency is to reflect back the higher harmonics (i.e. the frequency lines at the frequencies 2f0, 3f0, . . . ) and hence to send them again through the (non-linear) rectifier 5. Since the frequency differences between adjacent frequency lines respectively is equal to the basic frequency or the repetition rate of the individual pulses f0, energy is consequently supplied to the frequency line at the frequency f0 (i.e. the basic frequency). In order that the superimposition of the corresponding frequencies is also effected in phase relative to each other (constructive interference), corresponding phase adjusting blocks are provided. The receiving concept shown in FIG. 5 hence uses in addition also the energy of the harmonics of a higher order.

The receiving device shown in FIG. 5 firstly has a broadband antenna 4 for receiving. Connected downstream thereof is an interference rejecting filter 10 (optional component) which is used in the present case to block signals which are outside the predefined UWB frequency band or the corresponding frequency mask.

An amplifier 8a is connected downstream of the interference rejecting filter 10. This amplifier (advantageously a low-noise pre-amplifier) is used firstly for the purpose of amplifying the pulse train signal which is attenuated (on the transmission stretch) again to a suitable signal level. The reflection coefficient of the amplifier output is now configured such that it represents a short circuit or an open circuit for the frequencies n*f0 (n=1, 2, 3, . . . ). Hence, all the energy which is supplied by the basic frequency f0 and its higher harmonics 2f0, 3f0, . . . to the amplifier output from the direction of the rectifying unit 5 connected downstream of the amplifier is reflected back into the system (rather than petering out, as would normally be the case). The amplifier output here hence forms a back reflection plane 8 for the frequency lines and higher harmonics thereof to be let through by the subsequent frequency filter 6. Expressed in other words: the back reflection plane 8 configured by the amplifier 8a has a reflection coefficient of 1 or −1 for the frequency lines f0, 2f0, 3f0, . . . to be reflected.

The rectifying unit 5 is connected downstream of the amplifier 8a or of the back reflection plane 8. Basically, a rectifying unit 5, as was described also in the receiving variant shown in FIG. 4a, can be used for this purpose. However it is advantageous to use a rectifying unit 5 which is configured such that it lets through, in the backward direction or blocking direction, energies of the frequencies 2f0, 3f0, . . . (i.e. the higher harmonics of f0).

A plurality of individual phase adjusting blocks, connected in series, 9-1, 9-2, . . . are connected downstream of the rectifying unit 5. These phase adjusting blocks 9 are configured such that they superimpose the signal components reflected back on the back reflection plane 8 one upon the other constructively (i.e. the signal components running in the direction towards the frequency filter 6 and let through by the latter to the subsequent demodulation unit 7.

Each individual one of these phase adjusting blocks 9 has for example an earthed series oscillating circuit (LC series oscillating circuit, comprising a capacitor C and a coil L which is connected to earth). The actual phase adjusting blocks can thereby be configured as transmission line with a defined length in order to achieve the constructive interference. These LC series oscillating circuits are configured, with respect to their capacitances C and their inductances L, such that they represent, in succession, respectively a short circuit for one harmonic of the basic frequency f0: the first phase adjusting block 9-1 connected immediately downstream of the rectifying unit 5 forms a short circuit for the second harmonic 2f0, the phase adjusting block 9-2 subsequent to this phase adjusting block a short circuit for the third harmonic 3f0 etc. In order to increase the energy efficiency sufficiently, it is advantageous to use at least two, but better more than two, phase adjusting blocks.

The short-circuit circuits formed by the individual earthed LC series oscillating circuits reflect back the energy of the respective harmonic, by means of the rectifying unit or the diode 5, where it is reflected at the open or short-circuited output of the amplifier 8a and goes through for a second time the non-linear rectifying unit 5 and thus obtains the possibility of being converted into the basic frequency f0 in order hence to increase the energy in the basic frequency f0 correspondingly. The above-described construction of the phase adjusting blocks serves for the purpose of subjecting the individual deflected harmonics to a constructive interference. The different LC series oscillating circuits and phase adjusting stretches are used for the purpose of enabling control of each harmonic separately, i.e. independently of the other harmonics.

Following the last of the series-connected phase adjusting blocks 9 is then the band pass filter 6 which in turn lets through merely the basic frequency f0 here. Connected downstream thereof, there then follows finally the demodulator 7, with which the corresponding modulation scheme of the pulse train is demodulated.

Figure 6:
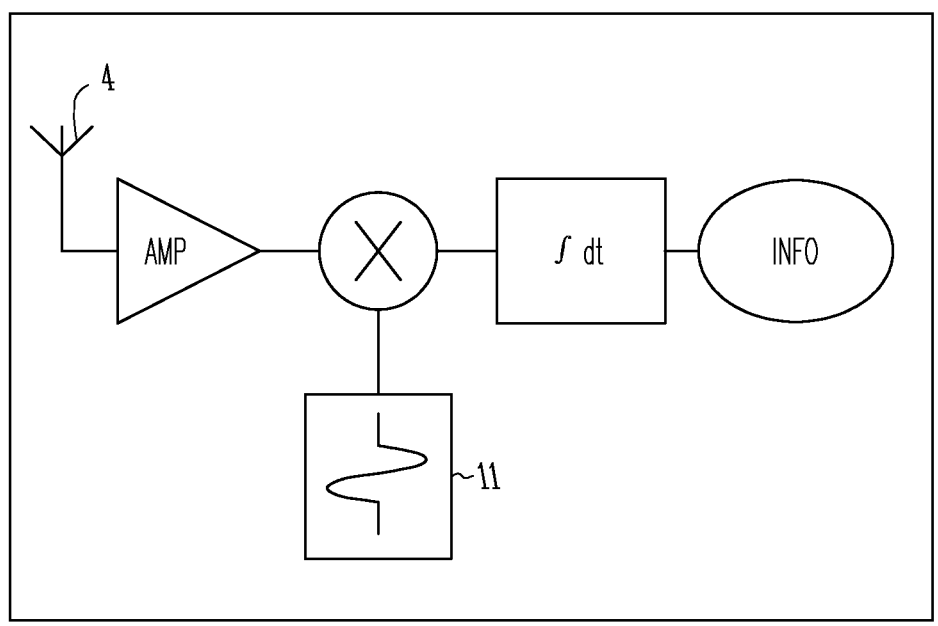
FIG. 6 a further alternative receiver concept within the scope of the present invention.

FIG. 6 finally shows a further receiver which can be used within the scope of the present invention. This concerns a correlation receiver. At the output of this receiver, the information Info can be obtained directly without the use of a demodulation block being necessary. However this also has disadvantages (see subsequently).

In the case of this receiver, there follows the antenna 4 an amplifier AMP, a correlator X to which a template pulse is supplied via a pulse generator 11 and finally an integrator at the output of which the information Info is obtained directly.

When using this correlation receiver, suitable synchronisation between the template pulse and the (supplied via the amplifier Amp) received pulse train must be ensured. This is disadvantageous, on the one hand, since it is complex (precise synchronisation), on the other hand, this can also be used for the purpose of implementing an additional time multiplexing of the pulse train by temporal interleaving of pulse trains of the same repetition rate in order to introduce an additional dimension of multiuser capacity.

In the case of an amplitude-modulated signal, the demodulation then results in an output amplitude which varies corresponding to the modulated individual pulses of the pulse train or the amplitude thereof. Likewise, receiving inverted pulses with this type of receiver is possible.

In the case of a frequency-modulated signal, the output amplitude varies corresponding to the autocorrelation function of the pulse form. Accordingly, the frequency deviation (average value position) must remain within a specific range since the autocorrelation function has merely a finite extension.

With this type of receiver, receiving and demodulation of modulation signals which use, in combination, an amplitude- and frequency modulation, are not possible.

What is claimed is:

1. A transmitting device, comprising:
   a pulse generator, configured to produce a pulse train having an individual pulse form such that the pulse train falls into a predefined frequency band and/or into a predefined frequency mask,
   a modulation unit, connected to the pulse generator, and configured to receive an analog information signal to be transmitted and to use the analog information signal to continuously analog-modulate the pulse train, produced by the pulse generator, into a continuum of intermediate levels, using a predefined modulation scheme with respect to an amplitude and/or a position of individual pulses of the pulse train, and
   an emitting unit, connected to the pulse generator and/or to the modulation unit;
   wherein the emitting unit is configured to emit the analog-modulated pulse train in the predefined frequency band and/or in the frequency range of the predefined frequency mask.

2. The transmitting device according to claim 1, wherein the modulation unit comprises a frequency-modulating and/or frequency shift keying unit having a signal output side that is connected to a signal input side of the pulse generator,
   wherein the modulation unit is configured to modulate a supplied information signal as a frequency-modulated carrier signal, and is configured to supply the carrier signal to the pulse generator as an input signal,
   wherein, from the input signal, the pulse generator is configured to generate a frequency-modulated pulse train corresponding to the frequency modulation of the input signal, such that the pulse train falls into the predefined frequency band and/or into the predefined frequency mask, and
   wherein the emitting unit is configured to emit the frequency-modulated pulse train as an analog-modulated pulse train.

3. The transmitting device according to claim 1, wherein the modulation unit comprises an amplitude-modulating and/or amplitude shift keying unit having a signal output side that is connected to a signal input side of the pulse generator, wherein the amplitude-modulating or amplitude shift keying unit is configured to amplitude-modulate a supplied information signal and a non-modulated pulse train, which is produced in the pulse generator and falls into the predefined frequency band and/or into the predefined frequency mask, wherein the emitting unit is configured to emit the amplitude-modulated pulse train as the analog-modulated pulse train.

4. The transmitting device according to claim 3, wherein the amplitude-modulating and/or amplitude shift keying unit comprises a tuneable attenuator or a multiplying element configured to adjust the amplitude of the individual pulses of the output signal corresponding to a momentary amplitude of the information signal, wherein the modulation unit comprises a unit connected on the signal output side to the signal input side of the pulse generator and produces a periodic, preferably sinusoidal, non-modulated carrier signal.

5. The transmitting device according to claim 1, wherein the modulation unit comprises:

a frequency-modulating or frequency shift keying unit and, synchronously thereto, an amplitude-modulating or amplitude shift keying unit, termed subsequently FM/AM unit, configured to frequency- and, synchronously thereto, amplitude-modulate an information signal supplied thereto, an amplitude-frequency separator, which is connected on a signal input side to a signal output side of the FM/AM unit and with a frequency output thereof to a signal input side of the pulse generator, and is configured to split the frequency- and, synchronously thereto, amplitude-modulated signal of the FM/AM unit into a frequency-modulated component and an amplitude-modulated component, and an amplitude-modulating and/or amplitude shift keying unit, which is connected on the signal input side to an amplitude output of the amplitude-frequency separator and to a signal output side of the pulse generator, and is configured to produce a pulse train using the pulse generator, wherein the pulse train is frequency-modulated corresponding to the frequency-modulated component, falls into the predefined frequency band and/or into the predefined frequency mask, and is amplitude-modulated with the amplitude-modulated component, wherein the frequency- and amplitude-modulated pulse train is emitted as the analog-modulated pulse train.

6. The transmitting device according to claim 5, wherein the amplitude-modulating and/or amplitude shift keying unit comprises a controllable amplitude regulator configured to adjust the amplitude of the individual pulses of the frequency-modulated pulse train corresponding to a momentary amplitude of the amplitude-modulated component.

7. A receiving device, comprising:

a receiving unit, configured to receive a continuously analog-modulated pulse train comprising a continuum of intermediate pulse levels, a rectifying unit which is connected downstream of the receiving unit and is configured to rectify the pulse train, the rectifying unit is configured as a diode half-wave- or diode full-wave rectifier and/or as a squarer, a band pass filter which is connected downstream of the rectifying unit and is configured to pass defined spectral ranges of the frequency spectrum of the pulse train after rectification of the pulse train, and a demodulation unit which is connected downstream of the frequency filter and is configured to demodulate the pulse train, after filtering thereof in the frequency filter, using a demodulation scheme according to a modulation scheme thereof.

8. The receiving device according to claim 7, further comprising:

a back reflection plane configured for back reflection from the frequency filter of frequency lines and/or higher harmonics thereof which are to be passed or have been passed, and one or more phase adjusting blocks connected downstream of the back reflection plane and with which signal components which are back reflected on the back reflection plane are superimposed constructively on the signal components which have been passed and/or are to be passed by the frequency filter.

9. The receiving device according to claim 8, wherein the back reflection plane is configured as a reflection plane which is connected between the receiving unit and rectifying unit for reflection of frequency lines and/or higher harmonics thereof which run in from the direction of the rectifying unit and are to be let through and/or have been let through by the frequency filter, wherein the reflection plane is part of an amplifier having an output reflection coefficient that is configured for reflection of the frequency lines and/or higher harmonics thereof, wherein the one or more phase adjusting blocks are connected downstream of the rectifying unit and are disposed in front of the frequency filter, wherein the one or more phase adjusting blocks have an earthed series oscillating circuit and/or are configured as a transmission line with a defined length.

10. The receiving device according to claim 7, wherein an interference rejecting filter is connected between the receiving unit and the rectifying unit and is configured to block transmitted signals outside of a predefined frequency band and/or predefined frequency mask, wherein the rectifying unit is configured to pass frequency lines and/or higher harmonics thereof which are to be passed and/or have been passed by the frequency filter in the backward direction.

11. A transmitting and receiving device, comprising:

a pulse generator, configured to produce a pulse train having an individual pulse form such that the pulse train falls into a predefined frequency band and/or into a predefined frequency mask, a modulation unit, connected to the pulse generator, and configured to receive an analog information signal to be transmitted and to use the analog information signal to continuously analog-modulate the pulse train, produced by the pulse generator, into a continuum of intermediate levels, using a predefined modulation scheme with respect to an amplitude and/or a position of the individual pulses of the pulse train, an emitting unit connected to the pulse generator and/or to the modulation unit;

wherein the emitting unit is configured to emit the analog-modulated pulse train in the predefined frequency band and/or in the frequency range of the predefined frequency mask, a receiving unit configured to receive a continuously analog-modulated pulse train comprising a continuum of intermediate pulse levels, a rectifying unit which is connected downstream of the receiving unit and is configured to rectify the pulse train, the rectifying unit is configured as a diode half-wave- or diode full-wave rectifier or as a squarer,
a frequency filter which is connected downstream of the rectifying unit and is configured to pass defined spectral ranges, and
a demodulation unit which is connected downstream of the frequency filter and is configured to demodulate the pulse train, after filtering thereof in the frequency filter, using a demodulation scheme according to a modulation scheme thereof.

12. A method, comprising:
producing a pulse train with an individual pulse form in a time range such that the pulse train falls into a predefined frequency band and/or into a predefined frequency mask,
continuously analog-modulating the produced pulse train into a continuum of intermediate levels using a received analog information signal to be transmitted and using a predefined, analog-modulation scheme with respect to the amplitude and/or the position of the individual pulses of the pulse train, and
emitting the continuously analog-modulated pulse train using an emitting unit,
receiving the continuously analog-modulated pulse train using a receiving unit,
rectifying the pulse train,
filtering the pulse train using a band pass frequency filter configured to pass a defined spectral range of the frequency spectrum of the pulse train after rectification of the pulse train, and
demodulating the pulse train using a demodulation scheme according to a modulation scheme thereof.

13. The method according to claim 12, comprising emitting the continuously analog-modulated pulse train using a transmitter device comprising:
a pulse generator, configured to produce a pulse train having an individual pulse form such that the pulse train falls into a predefined frequency band and/or into a predefined frequency mask,
a modulation unit, connected to the pulse generator, and configured to receive an analog information signal to be transmitted and to use the analog information signal to continuously analog-modulate the pulse train, produced by the pulse generator, into a continuum of intermediate levels, using a predefined modulation scheme with respect to an amplitude and/or a position of individual pulses of the pulse train,
an emitting unit connected to the pulse generator and/or to the modulation unit;
wherein the emitting unit is configured to emit the continuously analog-modulated pulse train in the predefined frequency band and/or in the frequency range of the predefined frequency mask,
a receiving unit configured to receive an analog-modulated pulse train,
a rectifying unit which is connected downstream of the receiving unit and is configured to rectify the pulse train, the rectifying unit is configured as a diode half-wave- or diode full-wave rectifier or as a squarer,
a band pass frequency filter which is connected downstream of the rectifying unit and is configured to pass defined spectral ranges of the frequency spectrum of the pulse train after rectification of the pulse train, and
a demodulation unit which is connected downstream of the frequency filter and is configured to demodulate the pulse train, after filtering thereof in the frequency filter, using a demodulation scheme according to a modulation scheme thereof.

14. The transmitting device according to claim 1, wherein the modulation scheme is at least one of an amplitude modulation or demodulation scheme (AM scheme), an amplitude shift keying scheme (ASK scheme), a frequency modulation or demodulation scheme (FM scheme), a frequency shift keying scheme (FSK scheme), a phase modulation or demodulation scheme (PSK scheme), or a quadrature amplitude modulation or demodulation scheme (QAM scheme),
wherein the predefined frequency band is a UWB frequency band and/or a frequency band in the range of 3.1 GHz to 10.6 GHz, or the predefined frequency mask is a predefined UWB frequency mask, and,
wherein the modulation unit is configured to modulate an information signal including at least one of an analog or a digital information signal and/or a voice signal, a music signal or a measuring data signal.

15. The transmitting device according to claim 1, wherein the modulation unit is a frequency shift keying (FSK) modulation unit configured to modulate a supplied information signal according to a frequency shift keying scheme.

16. The transmitting device according to claim 1, wherein the modulation unit is a amplitude shift keying (ASK) modulation unit configured to modulate a supplied information signal according to an amplitude shift keying scheme.

17. The transmitting device according to claim 1, wherein the modulation unit is a binary phase shift keying (PSK) modulation unit configured to modulate a supplied information signal according to a binary phase shift keying scheme.

18. The transmitting device according to claim 1, wherein the predefined frequency mask is a predefined UWB frequency mask defined by a maximum permitted average transmitting power in the range of 3.1 to 10.6 GHz or in the range of 6 to 8.5 GHz.

19. The transmitting device according to claim 5, wherein the amplitude-modulating and/or amplitude shift keying unit is configured to adjust the amplitude of the individual pulses of the frequency-modulated pulse train corresponding to a momentary amplitude of the amplitude-modulated component, and the amplitude-modulating and/or amplitude shift keying unit comprises at least one of a controllable attenuator unit, a controllable amplifying element, or a multiplying element.

20. The receiving device according to claim 7, wherein the frequency filter is a band pass filter configured to pass a modulated frequency line corresponding to at least one of a basic frequency or a repetition rate of the individual pulses of the analog-modulated pulse train.

* * * * *